(12) United States Patent
Cooper et al.

(10) Patent No.: US 7,472,347 B2
(45) Date of Patent: Dec. 30, 2008

(54) ALIGNED BEHAVIOR IN TEMPLATED LISTS

(75) Inventors: Kenneth Bruce Cooper, Seattle, WA (US); Ted Andrew Peters, Bellingham, WA (US)

(73) Assignee: Microsoft Corporation, Redmond, WA (US)

( * ) Notice: Subject to any disclaimer, the term of this patent is extended or adjusted under 35 U.S.C. 154(b) by 590 days.

(21) Appl. No.: 10/881,253

(22) Filed: Jun. 30, 2004

(65) Prior Publication Data

US 2006/0005120 A1 Jan. 5, 2006

(51) Int. Cl.
*G06F 17/00* (2006.01)
(52) U.S. Cl. .................................. 715/244; 715/235
(58) Field of Classification Search ........... 715/517, 715/521, 503, 504, 509, 243, 227, 212, 244, 715/235
See application file for complete search history.

(56) References Cited

U.S. PATENT DOCUMENTS

| | | | |
|---|---|---|---|
| 5,664,076 A | 9/1997 | Pluta et al. ............ 395/117 |
| 6,560,639 B1 * | 5/2003 | Dan et al. .............. 709/218 |
| 6,636,648 B2 * | 10/2003 | Loui et al. ............. 382/284 |
| 6,993,726 B2 * | 1/2006 | Rosenholtz et al. ...... 715/835 |
| 7,024,621 B1 * | 4/2006 | Tolpin ................... 715/517 |
| 7,051,291 B2 * | 5/2006 | Sciammarella et al. .... 715/838 |
| 7,124,360 B1 * | 10/2006 | Drenttel et al. ......... 715/517 |
| 7,237,227 B2 * | 6/2007 | Lei et al. ............... 717/110 |
| 2003/0065638 A1 | 4/2003 | Robert .................... 707/1 |
| 2004/0001106 A1 | 1/2004 | Deutscher et al. ........ 345/838 |
| 2004/0023127 A1 | 2/2004 | Soper et al. ............... 430/5 |
| 2004/0085256 A1 | 5/2004 | Hereld et al. ............ 345/1.1 |
| 2004/0088650 A1 * | 5/2004 | Killen et al. ............ 715/503 |
| 2004/0181543 A1 * | 9/2004 | Wu et al. ............... 707/102 |
| 2005/0091606 A1 * | 4/2005 | Sauermann .............. 715/788 |

FOREIGN PATENT DOCUMENTS

CA 2 043 148 11/1991

OTHER PUBLICATIONS

Castells, Pablo, et al, "Declarative Models of Presentation", Proceedings of the 2nd International Conference on Intelligent User Interfaces IUI '97, Jan. 1997, pp. 137-144.*
Bowman, R.J., "An Imaging Model for Analog Macrocell Layout Generation", *IEEE International Symposium on Circuits and Systems*, 1989, 2, 1127-1130.
Peng, HC. Et al., "Document Image Template Matching based on Component Block List", *Pattern Recognition Letters*, 2001, 22(9), 1033-1042.

* cited by examiner

*Primary Examiner*—Laurie Ries
(74) *Attorney, Agent, or Firm*—Woodcock Washburn LLP (57) ABSTRACT

A list control allows for a harmonized display of heterogeneous list element data by using at least two templates. The templates define the layout for the list element data. The templates consult an interface while calculating the layout. The interface provides information regarding the location of at least one gridline; the layout for the list element data is based on that location. The list control implements the interface, thus allowing heterogeneous templates to rely one interface providing on one gridline location. In order to take into account the requirements of each list element for gridline location, the interface requests information regarding a preliminary gridline location for each list element and bases the final gridline location on this information.

30 Claims, 6 Drawing Sheets

ALIGNED BEHAVIOR IN TEMPLATED LISTS

FIELD OF THE INVENTION

This invention relates in general to the field of computer graphics. More particularly, this invention relates to the layout of objects on a display.

BACKGROUND OF THE INVENTION

In order to display data to a user in a coherent and understandable manner, different techniques are used. For example, data may be displayed in a numbered list. In order to more coherently present data with several components, data can also be displayed in a table. The available space is carved into distinct cells, where each cell is a container for its contents. Frequently, larger elements (images, for example) must be sliced between cells in order to create the desired layout.

Cells in a table are arranged in rows and columns. Information will be supplied which is used to determine the width of columns and the height of rows, and this information will determine the dimensions and placement of each cell in the table. For example, a fixed width may be assigned to a column. Alternatively, column widths may be adjusted based on the data in the column. In order to provide for slightly more complex presentations, table cells may also be merged. However, because the width of columns is generally constant throughout the table (except for mergers), where there are a number of such mergers, setting the width of rows and columns such that the resulting table is clear and not distorted may not be possible.

With the advent of browser-style user interfaces, a new emphasis has developed on including images and flowed text in data displays. In order to allow for more complex table behavior, a user interface (UI) control known as the tabular list may be used. The tabular list UI control is used in order to allow complex list behavior for displaying data to a user. The tabular list UI control provides significant benefit by offering a single behavioral implementation for allowing the creation of tables. The tabular list UI control does this by providing a visual 'template' which is used to describe the appearance of each item in the list.

One problem that remains when using a tabular list UI control is in aligning the elements in the list relative to one another. It may be useful to present heterogeneous data via a tabular list control. Data may be heterogeneous in size, in type, or otherwise. Heterogeneous data may also include design elements, such as backgrounds. Current implementations do not allow the creation of a tabular list which takes into account the heterogeneity of data in order to allow proper placement of the elements of the list which will allow for the creation of a table including heterogeneous data while allowing alignment of the heterogeneous data in a uniform manner, without requiring user labor both initially and in the case of changes to the table. Additionally, current implementations do not allow for complex overlapping behavior. Such behavior may be desirable in order to create a more understandable or well-designed presentation to the user.

In view of the foregoing, there is a need for systems and methods that overcome the limitations and drawbacks of the prior art.

SUMMARY OF THE INVENTION

The present invention is directed to an improved list control which allows for complex overlapping behavior and performs size calculations intelligently without complexity. In order to accomplish this, the list control is provided with grid layout functionality.

An interface is provided which allows communication between a list and templated list elements. In order to provide a column-aligned (or row-aligned) result in a list with elements using heterogeneous templates, the templates rely on an interface to perform column calculations (or row calculations). The templates, when included as part of a list, defer to the list as the implementer of the interface. By default, the implementer is the template itself, so a template not placed in the context of a list will calculate its own column or row widths.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
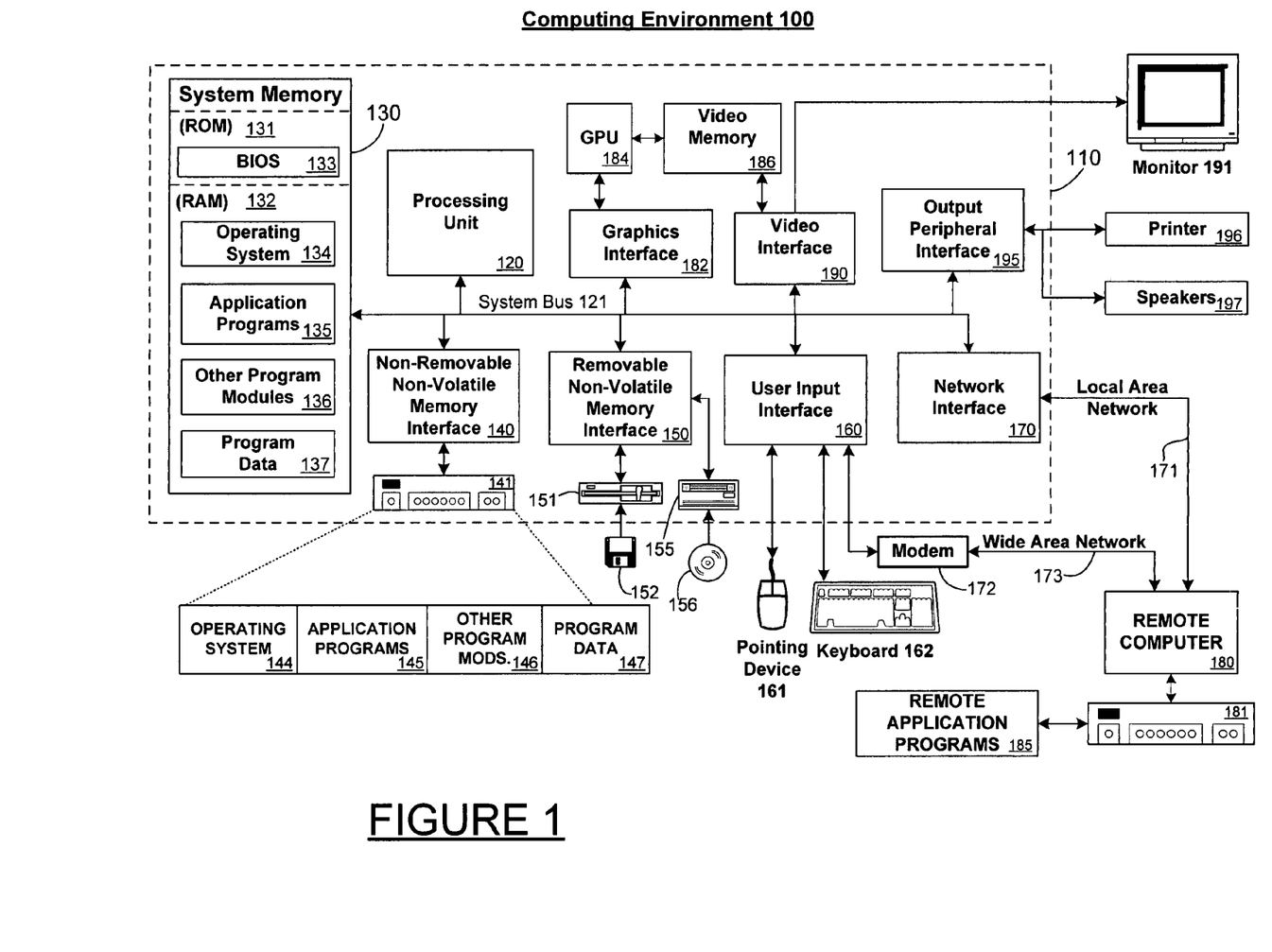
FIG. 1 is a block diagram showing an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Aligning Heterogeneous Layouts in a List

In order provide for heterogeneous information to be provided in a list, heterogeneous templates are created for list elements. The list elements are contained in a list control, a subsuming container for list elements. The list control uses the templates to provide a layout for the list data.

Figure 2A:
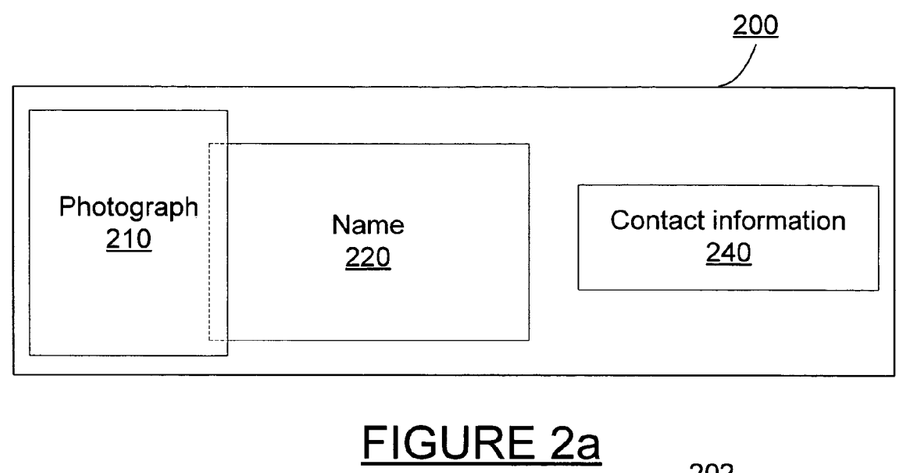
FIG. 2A is a block diagram of one exemplary template for a list

FIG. 2A is a block diagram of one exemplary template for a list element. FIG. 2A shows a first template 200 which includes subelements of a photograph field 210, a name field 220, and contact information field 240. The photograph field 210 and the name field 220 are shown as overlapping. The template may include information on how to place these fields relative to each other.

Such templates are used to display data. Where only one template such as first template 200 is used, the list consists of one or more list elements arranged according to the specifications of first template 200. First template 200 may allow each of the subelements 210, 220 and 240 of the template to be only of a specific size. In that case, the appearance of the list will be orderly, although where data to be displayed in a subelement exceeds the allotted size, the data may not be displayable in the area allotted to the subelement.

Alternatively, the template may allow the subelements of this list element to be of different sizes. For example, the first template 200 may allow name field 220 and contact information field 240 to be filled by text strings which are different lengths. Name field 220 may also be filled by a graphic, for example, where the name field 220 is used for a name of a company, and the name field 220 to be used is a graphic of the company's logo. The photograph 210 may be constrained by a template to be a specific size, or may be variable depending on the photograph being used. The template may be flexible enough to handle situations in which no photograph is provided. It can be seen that in these different scenarios, different list elements entered according to the first template 200 may have differently sized subelements.

Figure 2B:
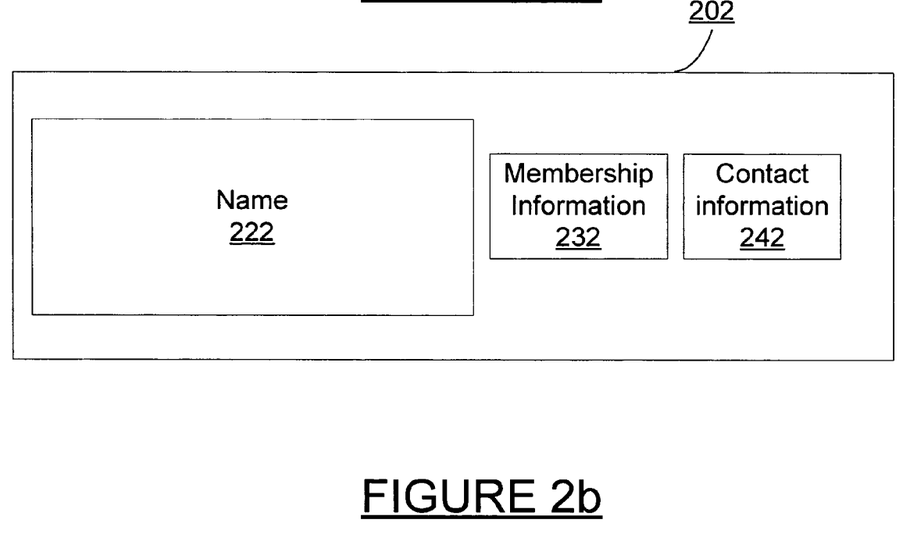
FIG. 2B is a block diagram of a second exemplary template for a list element

Additionally, different templates may include different subelements. FIG. 2B is a block diagram of a second exemplary template for a list element. FIG. 2B shows a second template 202 which includes subelements of a name field 222, membership information field 232, and contact information field 242. No photograph field is included in second template 202. The subelement for membership information included in second template 202 is not included in first template 200.

Figure 3A:
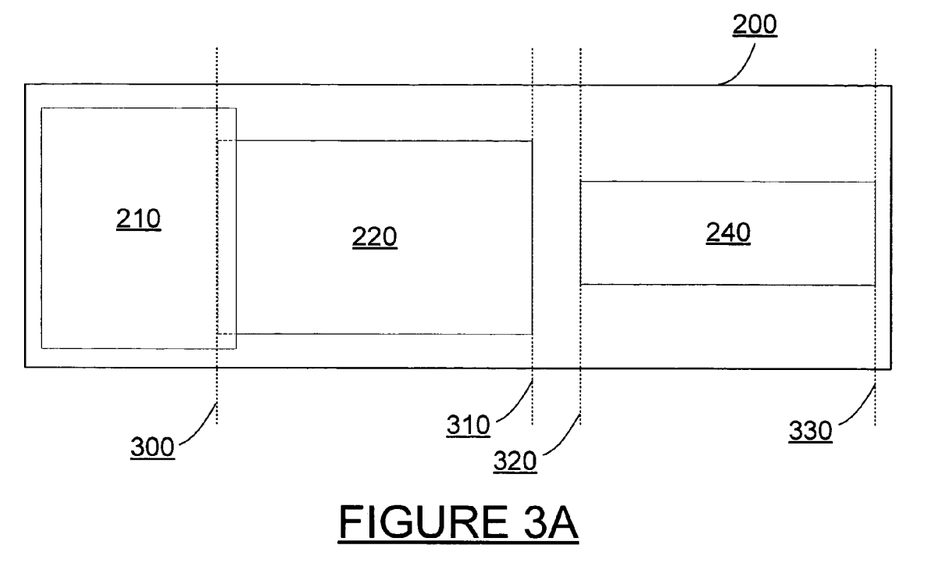
FIG. 3A is a block diagram of a first exemplary template with grid lines

In a given list, two or more templates such as first template 200 and second template 202 are used. In order to provide alignment of similar elements with respect to each other, the templates include grid lines. FIG. 3A is a block diagram of a first exemplary template with grid lines. As shown in FIG. 3A, four grid lines are shown with respect to first exemplary template 200. The first grid line 300 indicates the start of the name field 220. The second grid line 310 indicates the end of the name field 220. The third grid line 320 indicates the beginning of contact information field 240, and the fourth grid line 330 indicates the end of contact information field 240. If the position of the grid lines in a number of list elements according to first template 200 is coordinated, then the list elements will display the data in a heterogeneous manner.

Figure 3B:
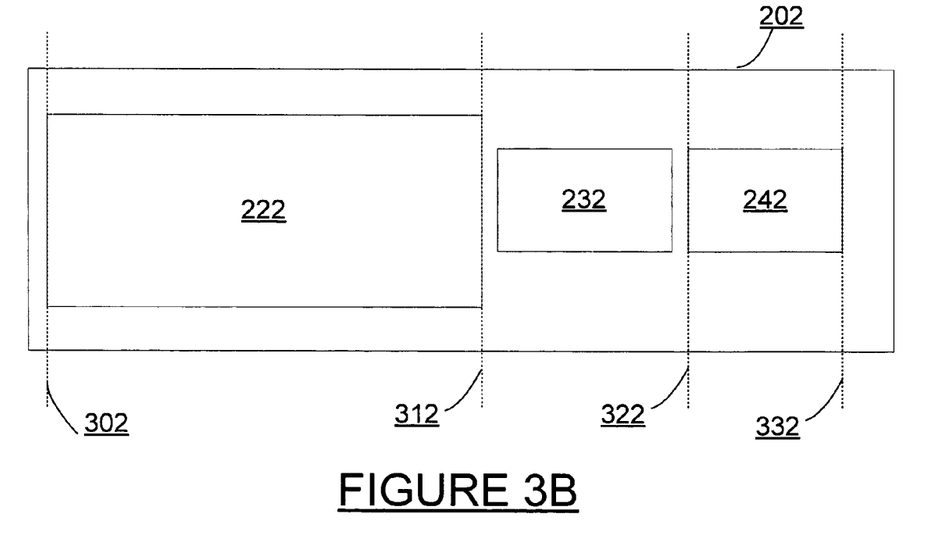
FIG. 3B is a block diagram of a second exemplary template with grid lines.

FIG. 3B is a block diagram of a second exemplary template with grid lines. As shown in FIG. 3B, four grid lines are shown with respect to second exemplary template 202. The first grid line 302 indicates the start of the name field 222. The second grid line 312 indicates the end of the name field 222. The third grid line 322 indicates the beginning of contact information field 242, and the fourth grid line 332 indicates the end of contact information field 242.

In a list containing list elements which are templated according to the first template 200 and second template 202, if the position of all first grid lines 300 and 302 are aligned, then the different instances of name field 220 and 222 will begin in the same location. Similarly, if the positions of all second grid lines 310 and 312 in all list elements are aligned, then all different instances of name field 220 and 222 will end in the same location. This allows for the appearance of the list to be somewhat uniform, with respect to the name field, even where templates mandate the inclusion of different information or the use of different layouts for information.

Figure 4:
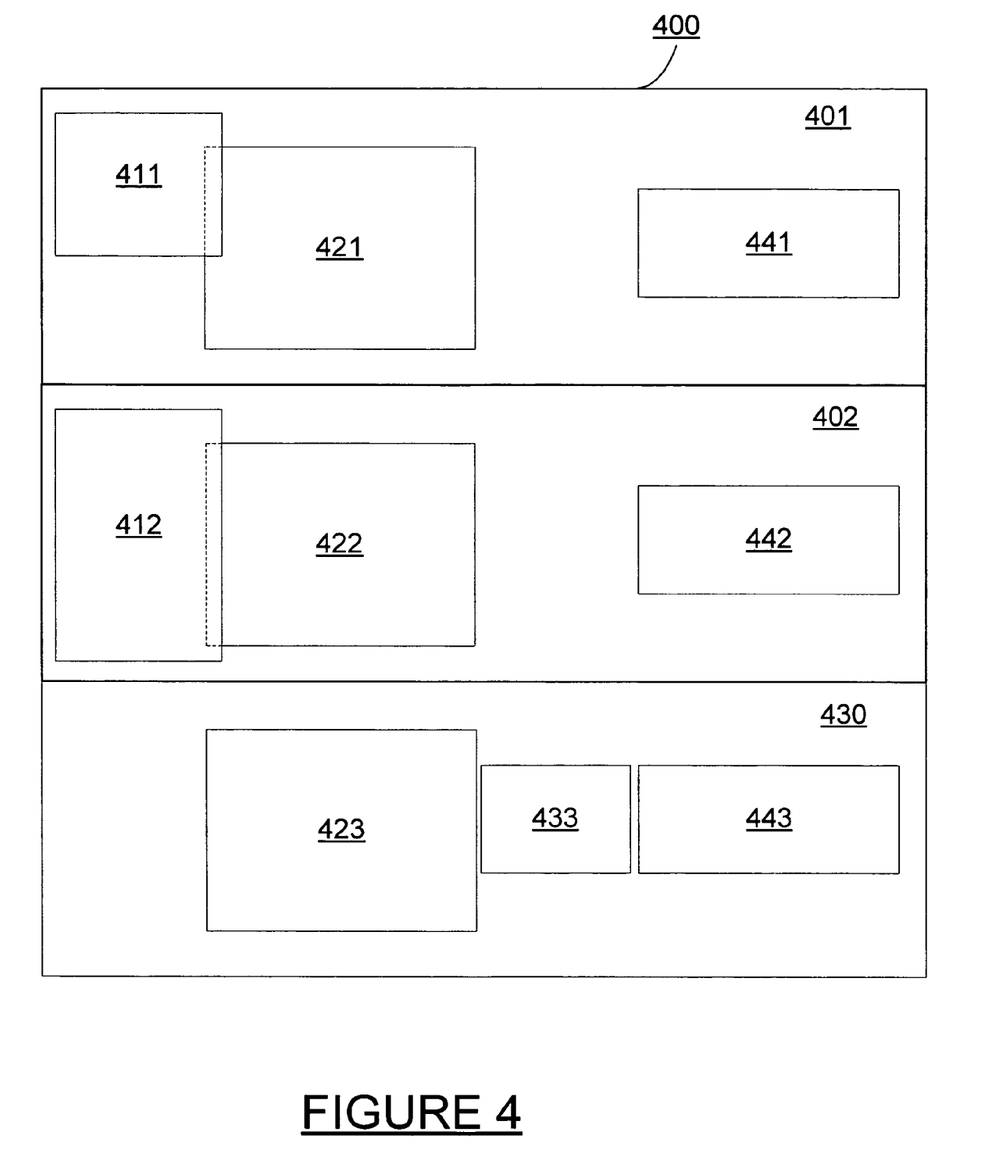
FIG. 4 is a block diagram of a list aligned according to the gridlines in the first and second exemplary templates.

Similarly, if the position of all third grid lines 320 and 322 are aligned and all fourth grid lines 330 and 332 are aligned, then in each different instances of list elements, contact information fields 240 and 242 will be aligned. FIG. 4 is a block diagram of a list aligned according to the gridlines in the first and second exemplary templates. In FIG. 4, the list 400 consists of three list elements 401, 402, and 403. List elements 401 and 402 are laid out according to the first exemplary template. Thus photographs 411 and 412 are laid out according to the photograph field information in the first template. The name information 421 and 422 are laid out according to the name field information in the first template. The contact information 441 and 442 are laid out according to the contact field information in the first template.

List element 403 is laid out according to the second exemplary template. Thus name information 423 is laid out according to the name field information in the second template, membership information 433 according to the membership information field in the second template, and contact information according to the contact information field 443.

In list 400, it can be seen that the start and end of the areas containing name information 421, 422 and 423 are aligned, and that the start and end of the areas containing contact information 441, 442, and 443 are aligned. This alignment is due to the alignment of the gridlines in the templates used to display each of the list elements 401, 402, and 403.

Creating the Alignment for Heterogeneous Templates

In order to allow heterogeneous templates to be used to create a list aligned with respect to predetermined gridlines, the templates being used for list elements factor out certain column calculations to an interface. Whenever it is calculating the location for the gridlines, the template defers to the implementer of the interface. The default for the implementer of the interface is the template itself, so that a template that is not placed in the context of a list will calculate for itself the location of the gridlines.

In one embodiment, a list control creates content by iterating over the data items for the list, selecting an appropriate template for each data item, creating an instance of a control from that template, and adding that control as a child. As each child control is added, the interface which controls the column calculations is set to the list control's column calculation interface. This way, when the template for the child is calculating the location of gridlines in determining column widths, it will defer to the list control, specifically to the list control's implemented column calculation interface.

In one embodiment, a template makes a preliminary calculation of the gridlines based on the space requirements for the fields defined by the template and the data to be placed in the template. The list control's column calculation interface queries each list element for the results of this preliminary calculation. The list control's column calculation interface then calculates the position for the gridlines based on these calculation and any additional policies or restrictions. The positions for the gridlines are then returned to the templates via the interface.

Figure 5:
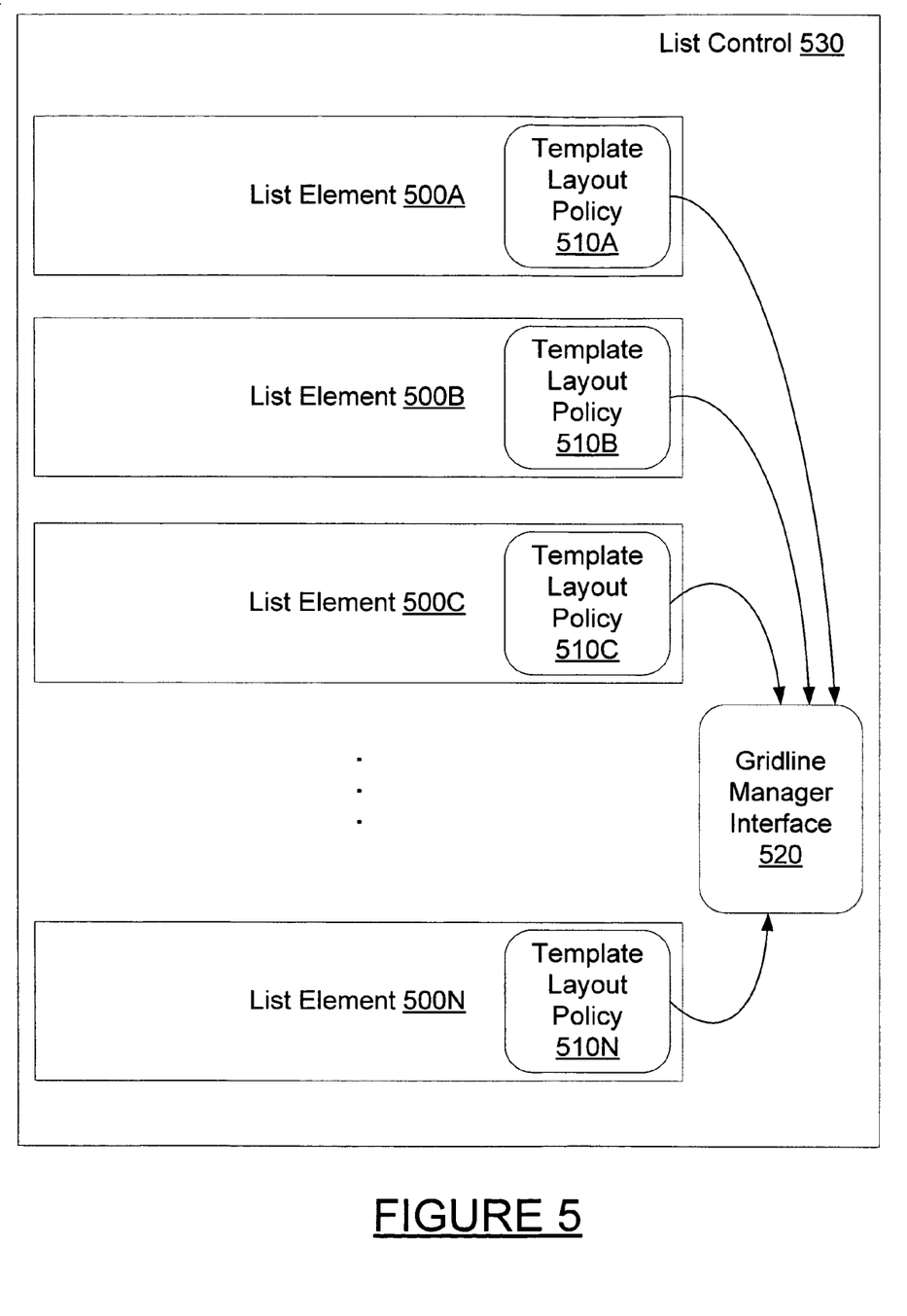
FIG. 5 is a block diagram illustrating a list control according to one embodiment of the invention.

FIG. 5 is a block diagram illustrating a list control according to one embodiment of the invention. As shown in FIG. 5, the list control 530 includes a column calculation interface—gridline manager interface 520. Each list element 500A through 500N includes template layout policies 510A through 510N (respectively). Different templates may be used to create the list elements 500A through 500N. Each template layout policy 510A through 510N is derived from the template which is used for the list element. The template layout policies describe the layout of the list element. However, as shown in FIG. 5, in a list control 530, the layout policies 510A through 510N defer to the gridline manager interface 520 for specific column positionings. As described above, the placement of certain gridlines are determined by the gridline manager interface 520. In this way, heterogeneous templates may be harmonized.

Figure 6:
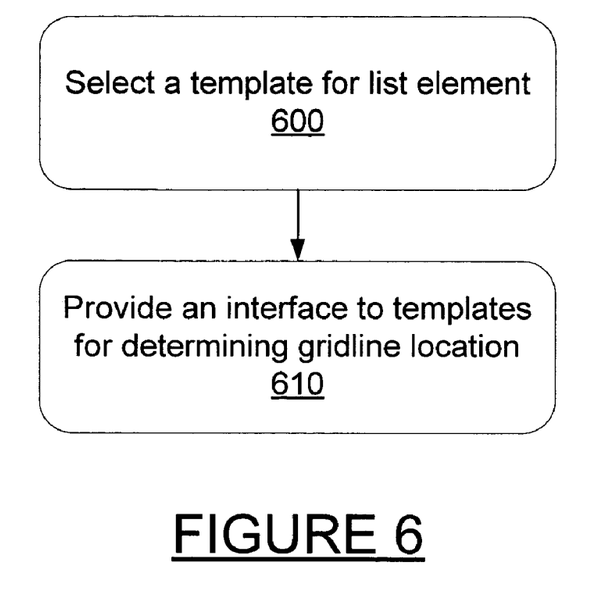
FIG. 6 shows an exemplary method of generating display information for a set of list data according to one embodiment of the invention.

The list control generates display information using the templates and the list data. FIG. 6 shows an exemplary method of generating display information for a set of list data according to one embodiment of the invention. The list data is grouped into sets of list element data. Each set of list element data contains the subelements for the list element. For example, the list element data may include a photograph, name, and contact information to be displayed in one list element.

As shown in FIG. 6, in step 600, for each set of list element data, a template is selected. The template is selected from a template set of at least two possible templates. Each of the possible templates provides a layout policy for calculating a graphical layout for the list element data. At least two of the possible templates rely on the location of at least one gridline to determine the graphical layout for the list element data. In one embodiment, more than one gridline may be used by a template to determine the graphical layout for the list element data.

In step 610, an interface is provided for use by any template. The interface provides information establishing the location of the gridlines to be used. This may be done by requesting preliminary information regarding the position of the gridline from templates which use the gridline. In this way, the requirements of the templates for the list elements are considered when the interface determines the gridline location. While locating one gridline is described, more than one gridline may also be located in the same way, via an interface which queries the list elements as templated for preliminary gridline locations and then using these locations (and other list layout information) in order to determine locations for the gridlines.

Figure 7:
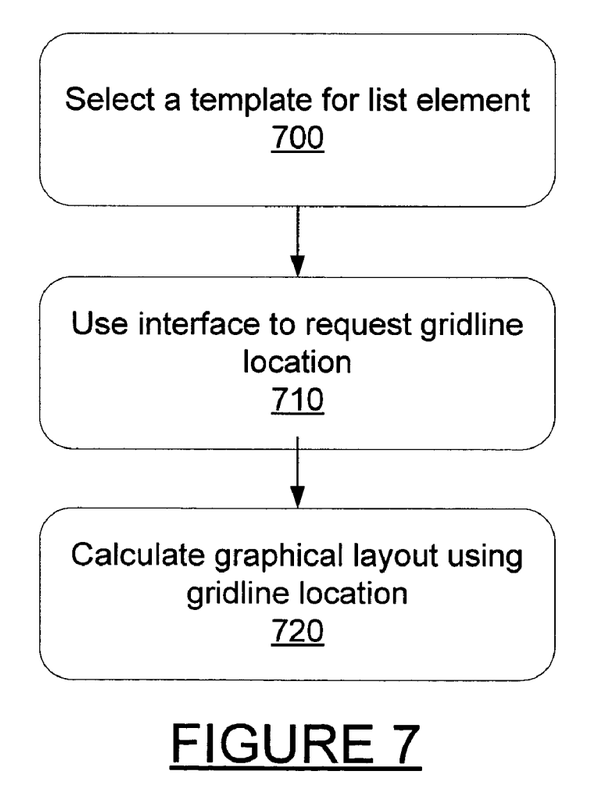
FIG. 7 shows an exemplary method of determining the graphical layout of list element data according to one embodiment of the invention.

The layout for each list element is determined using a template and the interface for determining the location of specific gridlines. FIG. 7 shows an exemplary method of determining the graphical layout of list element data according to one embodiment of the invention. For the list element data, as shown in FIG. 7, step 700, a template is selected from a template set of at least two possible templates. Each of the possible templates provides a corresponding layout policy for calculating a graphical layout of said subset of list element data based on the location of at least one gridline. In step 710, an interface is used to request a position for a selected gridline. In step 720, the position of the selected gridline is used to calculate a graphical layout for the list element data.

One-Dimensional Layout Control

While exemplary embodiments of the present invention have been described in connection with column width control, the harmonization of the list elements in any dimension is contemplated. Thus, in the case where a list is laid out with list elements aligned next to each other horizontally, the techniques of the present invention may be used to control the vertical alignment of subelements in the list elements. Any harmonization of a number of list elements in one dimension may be performed according to the techniques of the invention.

CONCLUSION

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method of generating display information for a set of list data, said list data comprising at least one set of list element data, the method comprising:
    selecting, for each of a plurality of list elements comprised in a list control, a template from a template set of at least two templates, where each of said templates provides a corresponding layout policy for calculating a graphical layout of of list element data, and where at least two of said corresponding layout policies provide for a graphical layout based on a location of a gridline;
    providing an interface, said interface adapted to query each of the plurality of list elements for a template comprising preliminary gridline location information for displaying data in the list element;
    at the interface, using preliminary gridline location information from the template for each of the plurality of list elements to determine a graphical layout for list data in all of the plurality of list elements;
    at the interface, communicating the graphical layout to each of the plurality of list elements; and
    at each of the plurality of list elements, displaying list data in the list element according to a template selected for the list element and the graphical layout.

2. The method of claim 1, where said interface establishes said location of said gridline by determining, for each list element where said selected template for said list element provides a corresponding layout policy for displaying list element data based on the location of at least one gridline, a preliminary calculation of a location for said gridline.

3. The method of claim 1, where said gridline comprises a column boundary for said list data.

4. The method of claim 1, where said graphical layout comprises boundary information for at least one list element in said set of list elements.

5. The method of claim 1, where for each list element where said selected template for said list element provides a corresponding layout policy for displaying list element data based on said location of said gridline, said boundary information defines a boundary for at least one item of list element data based on said gridline.

6. The method of claim 1, where at least two of said corresponding layout policies provide for a graphical layout based on a location of two or more gridlines and where said interface provides information establishing a location for each of said two or more gridlines.

7. A method for determining the graphical layout of list element data, said method comprising:
    selecting, for each of a plurality of list elements comprised in a list control, a template from a template set of at least two templates, where each of said templates provides a corresponding layout policy for calculating a graphical layout of list element data based on the location of at least one gridline;
    using an interface to query each of the list elements for a template comprising preliminary gridline location information for displaying data in the list element; and
    at the interface using the preliminary gridline information from the template for each of the plurality of list elements to determine a graphical layout for list data;
    at the interface, communicating the graphical layout to each of the plurality of list elements; and
    at each of the plurality of list elements, displaying list data in the list element according to a template selected for the list element and the graphical layout.

8. The method of claim 7, further comprising:
    in response to a request from said interface, calculating preliminary location data for said at least one gridline.

9. The method of claim 7, where said selected gridline comprises a column boundary for said list data.

10. The method of claim 7, where said graphical layout comprises boundary information for at least one item of data from among said list element data.

11. The method of claim 7, where said boundary information defines a boundary for at least one item of list element data based on one of said at least one gridlines.

12. The method of claim 7, further comprising the step of using an interface to request a position for each of said at least one gridlines.

13. The method of claim 7, further comprising:
    in response to a request from said interface, calculating a preliminary gridline position for list element data.

14. A display device having rendered thereon list layout data comprising at least one set of list element layout data, each of said list element layout data corresponding to a set of list element layout data and computed by:
    selecting, for each of a plurality of list elements comprised in a list control, a template from a template set of at least two templates, where each of said templates provides a corresponding layout policy for calculating a graphical layout of list element data, and where at least two of said corresponding layout policies provide for a graphical layout based on the location of at least one gridline;
    providing an interface, said interface adapted to query each of the plurality of list elements for a template comprising preliminary gridline location information for displaying data in the list element;
    at the interface, using the preliminary gridline location information from the template for each of the plurality of list elements to determine a graphical layout for list data;
    at the interface, communicating the graphical layout to each of the plurality of list elements; and
    at each of the plurality of list elements, displaying list data in the list element according to a template selected for the list element and the graphical layout.

15. The display device of claim 14, where said interface establishes said location of said gridline by determining, for each list element where said selected template for said list element provides a corresponding layout policy for displaying list element data based on the location of at least one gridline.

16. The display device of claim 14, where said at least one gridline comprises a column boundary for said list data.

17. The display device of claim 14, where said graphical layout comprises boundary information for at least one item of list element data in said set of list element data.

18. The display device of claim 14, where for each set of list element data where said selected template for said set provides a corresponding layout policy for displaying list element data based on the location of at least one gridline, said boundary information defines a boundary for at least one item of list element data based on said gridline.

19. A computer-readable storage medium having computer-executable instructions for generating display information for a set of list data, said list data comprising at least one set of list element data, said instructions for performing steps comprising:
- selecting, for each of a plurality of list elements comprised in a list control, a template from a template set of at least two templates, where each of said templates provides a corresponding layout policy for calculating a graphical layout of list element data, and where at least two of said corresponding layout policies provide for a graphical layout based on a location of a gridline;
- providing an interface, said interface adapted to query each of the plurality of list elements for a template comprising preliminary gridline location information for displaying data in the list element;
- at the interface using the preliminary gridline location information from the template for each of the plurality of list elements to determine a graphical layout for list data in all of the plurality of list elements;
- at the interface, communicating the graphical layout to each of the plurality of list elements; and
- at each of the plurality of list elements, displaying list data in the list element according to a template selected for the list element and the graphical layout.

20. The computer-readable storage medium of claim 19, where said at least one gridline comprises a column boundary for said list data.

21. The computer-readable storage medium of claim 19, where said graphical layout comprises boundary information for at least one list element in said set of list elements.

22. The computer-readable storage medium of claim 19, where for each list element where said selected template for said list element provides a corresponding layout policy for displaying list element data based on the location of at least one gridline, said boundary information defines a boundary for at least one item of list element data based on said gridline.

23. The computer-readable storage medium of claim 19, where at least two of said corresponding layout policies provide for a graphical layout based on a location of two or more gridlines and where said interface provides information establishing a location for each of said two or more gridlines.

24. A computer-readable storage medium having computer-executable instructions for determining the graphical layout of list element data, said instructions for performing steps comprising:
- selecting, for each of a plurality of list elements comprised in a list control, a template from a template set of at least two templates, where each of said templates provides a corresponding layout policy for calculating a graphical layout of list element data based on the location of at least one gridline;
- at an interface, querying each of the list elements for a template comprising preliminary gridline location information for displaying data in the list element;
- at the interface, creating an instance of a control for each of the templates;
- at the interface, adding the created control as a child control;
- at the interface, using the preliminary gridline information from the template for each of the plurality of list elements to determine a graphical layout for list data;
- at the interface, communicating the graphical layout to each of the plurality of list elements; and
- at each of the plurality of list elements, displaying list data in the list element according to a template selected for the list element and the graphical layout.

25. The computer-readable storage medium of claim 24, said instructions for performing steps farther comprising:
- in response to a request from said interface, calculating preliminary location data for said at least one gridline.

26. The computer-readable storage medium of claim 24, where said selected gridline comprises a column boundary for said list data.

27. The computer-readable storage medium of claim 24, where said graphical layout comprises boundary information for at least one item from among said set of list element data.

28. The computer-readable storage medium of claim 24, where said boundary information defines a boundary for at least one item of list element data based on one of said at least one gridlines.

29. The computer-readable storage medium of claim 24, where said step of using an interface to request a position requests a position for each of said at least one gridlines.

30. The computer-readable storage medium of claim 24, said instructions for performing steps farther comprising:
- in response to a request from said interface, calculating a preliminary gridline position for list element data.

* * * * *